(12) United States Patent
Zhang (10) Patent No.: US 12,277,796 B2
(45) Date of Patent: Apr. 15, 2025

(54) FINGERPRINT RECOGNITION METHOD, ELECTRONIC DEVICE, AND READABLE STORAGE MEDIUM

(71) Applicant: VIVO MOBILE COMMUNICATION CO., LTD., Guangdong (CN)

(72) Inventor: Hanyu Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/393,223

(22) Filed: Dec. 21, 2023

(65) Prior Publication Data

US 2024/0127624 A1 Apr. 18, 2024

Related U.S. Application Data

(63) Continuation of application No. PCT/CN2022/099800, filed on Jun. 20, 2022.

(30) Foreign Application Priority Data

Jun. 22, 2021 (CN) .......................... 202110692667.2

(51) Int. Cl.
*G06V 40/12* (2022.01)
*G06V 10/34* (2022.01)
(Continued)

(52) U.S. Cl.
CPC .......... *G06V 40/1347* (2022.01); *G06V 10/34* (2022.01); *G06V 10/806* (2022.01); *G06V 40/1306* (2022.01); *G06V 40/1365* (2022.01)

(58) Field of Classification Search
CPC .. G06V 40/1347; G06V 10/34; G06V 10/806; G06V 40/1306; G06V 40/1365; G06F 21/32
See application file for complete search history.

(56) References Cited

U.S. PATENT DOCUMENTS 10,229,259 B2    3/2019  Wang et al.
2015/0133084 A1*  5/2015  Baek ...................... G06V 40/50
                                                         455/411
(Continued)

FOREIGN PATENT DOCUMENTS

CN    101079106 A    11/2007
CN    105022984 A    11/2015
(Continued)

OTHER PUBLICATIONS

Alshehri et al., "Cross-Sensor Fingerprint Matching Method Based on Orientation, Gradient, and Gabor-HoG Descriptors With Score Level Fusion", IEEE Access, vol. 6, pp. 28951-28968, May 28, 2018.

(Continued)

*Primary Examiner* — Antonio Xavier
(74) *Attorney, Agent, or Firm* — Harness, Dickey & Pierce, P.L.C.

(57) ABSTRACT

A fingerprint recognition method that is performed by an electronic device including a first screen and a second screen includes: obtaining first fingerprint information through the first screen; extracting a first fingerprint feature from the first fingerprint information based on a fingerprint recognition mode corresponding to the second screen, and using the first fingerprint feature as a first pre-stored fingerprint template corresponding to the second screen; obtaining second fingerprint information through the second screen; and extracting a second fingerprint feature from the second fingerprint information, and determining whether the second fingerprint feature matches the first pre-stored fingerprint template.

12 Claims, 6 Drawing Sheets

(51) Int. Cl.
*G06V 10/80* (2022.01)
*G06V 40/13* (2022.01)

(56) References Cited

U.S. PATENT DOCUMENTS

| | | | | |
|---|---|---|---|---|
| 2017/0053110 | A1* | 2/2017 | Wang | G06F 9/4856 |
| 2018/0011973 | A1* | 1/2018 | Fish | A61B 5/1176 |
| 2019/0228206 | A1* | 7/2019 | Baudot | H04N 23/80 |
| 2020/0050828 | A1* | 2/2020 | Li | G06T 5/50 |
| 2020/0133335 | A1* | 4/2020 | Wu | H05K 1/189 |
| 2021/0326560 | A1* | 10/2021 | Ye | G06V 40/1318 |
| 2021/0368037 | A1* | 11/2021 | Zhang | H04M 1/724631 |
| 2023/0188638 | A1* | 6/2023 | Li | H04M 1/72403 |
| | | | | 455/566 |

FOREIGN PATENT DOCUMENTS

| | | |
|---|---|---|
| CN | 106470239 A | 3/2017 |
| CN | 107395363 A | 11/2017 |
| CN | 208046678 U | 11/2018 |
| CN | 110795020 A | 2/2020 |
| CN | 112764579 A | 5/2021 |
| CN | 113486738 A | 10/2021 |
| JP | 2011253378 A | 12/2011 |
| WO | WO-2020135182 A1 | 7/2020 |

OTHER PUBLICATIONS

Extended European Search Report regarding European Patent Application No. 22827516.0, dated Sep. 17, 2024.
First Office Action regarding Chinese Patent Application No. 202110692667.2, dated Jan. 16, 2024. Translation provided by Bohui Intellectual Property.
International Search Report and Written Opinion of the International Searching Authority regarding International Patent Application No. PCT/CN2022/099800, dated Aug. 31, 2022. Translation provided by Bohui Intellectual Property.

* cited by examiner

FIG. 8

FINGERPRINT RECOGNITION METHOD, ELECTRONIC DEVICE, AND READABLE STORAGE MEDIUM

CROSS-REFERENCE TO RELATED APPLICATIONS

This application is a Bypass Continuation Application of PCT/CN2022/099800 filed on Jun. 20, 2022, which claims priority to Chinese Patent Application No. 202110692667.2 filed on Jun. 22, 2021, which are incorporated herein by reference in their entirety.

TECHNICAL FIELD

This application belongs to the technical field of electronic devices, and in particular, relates to a fingerprint recognition method, an electronic device, and a readable storage medium.

BACKGROUND

Generally, a plurality of screens (such as a foldable screen, a double-sided screen, or a three-sided screen) are arranged on a multi-screen electronic device to enable a user to simultaneously perform a plurality of operations such as playing a game, sending a message, and watching a video, so as to satisfy diversified demands of users. In the multi-screen electronic device, different fingerprint recognition modules, such as an optical fingerprint module, a semiconductor fingerprint module, and a radio frequency fingerprint module are arranged on different screens.

For the multi-screen electronic device, fingerprint information needs to be obtained through all screens to extract and generate pre-stored fingerprint feature information corresponding to each screen. In other words, for the multi-screen electronic device, the fingerprint information needs to be obtained repeatedly through different screens to achieve fingerprint recognition, resulting in a high user operation redundancy.

SUMMARY

In a first aspect, an embodiment of this application provides a fingerprint recognition method, which is performed by an electronic device including a first screen and a second screen. The method includes:
  obtaining first fingerprint information through the first screen;
  extracting a first fingerprint feature from the first fingerprint information based on a fingerprint recognition mode corresponding to the second screen, and using the first fingerprint feature as a first pre-stored fingerprint template corresponding to the second screen;
  obtaining second fingerprint information through the second screen; and
  extracting a second fingerprint feature from the second fingerprint information, and determining whether the second fingerprint feature matches the first pre-stored fingerprint template.

In a second aspect, an embodiment of this application provides a fingerprint recognition apparatus, which is applied to an electronic device including a first screen and a second screen. The apparatus includes an obtaining module, an extraction module, and a judgment module.

The obtaining module is configured to obtain first fingerprint information through the first screen.

The extraction module is configured to extract a first fingerprint feature from the first fingerprint information based on a fingerprint recognition mode corresponding to the second screen, and use the first fingerprint feature as a first pre-stored fingerprint template corresponding to the second screen.

The obtaining module is further configured to obtain second fingerprint information through the second screen.

The judgment module is configured to extract a second fingerprint feature from the second fingerprint information, and determine whether the second fingerprint feature matches the first pre-stored fingerprint template extracted by the extraction module.

In a third aspect, an embodiment of this application provides an electronic device. The electronic device includes a processor, a memory, and a program or an instruction stored in the memory and executable in the processor. The program or the instruction, when executed by the processor, implements the steps of the method in the first aspect.

In a fourth aspect, an embodiment of this application provides a non-transitory readable storage medium storing a program or an instruction. The program or the instruction, when executed by a processor, implements the steps of the method in the first aspect.

In a fifth aspect, an embodiment of this application provides a chip. The chip includes a processor and a communication interface, the communication interface is coupled to the processor, and the processor is configured to execute a program or an instruction to implement the method in the first aspect.

In a sixth aspect, an embodiment of this application provides a computer program product stored in a non-volatile storage medium. The program product is executed by at least one processor to implement the method in the first aspect.

DETAILED DESCRIPTION

The technical solutions in embodiments of this application are clearly described below with reference to the drawings in the embodiments of this application. Apparently, the described embodiments are merely some of the embodiments of this application rather than all of the embodiments. All other embodiments obtained by a person of ordinary skill in the art based on the embodiments of this application fall within the protection scope of this application.

Terms "first", "second", and the like in the specification and the claims of this application are used to distinguish between similar objects, rather than describe a specific sequence or order. It should be understood that data used in this way may be transposed where appropriate, so that the embodiments of this application described herein may be implemented in an order different from those illustrated or described herein. In addition, the objects distinguished by "first", "second", and the like are generally of the same class and do not limit a quantity of objects. For example, one or more first objects may be arranged. In addition, "and/or" used in the specification and the claims indicates at least one of the connected objects. The character "/" generally indicates an "or" relationship between the associated objects.

A fingerprint recognition method provided in the embodiments of this application is described below in detail through specific embodiments with reference to the drawings.

Since a fingerprint recognition module corresponding to each screen of a multi-screen electronic device operates independently, for a same screen, corresponding pre-stored fingerprint feature information may be generated only through obtaining of fingerprint information through the screen. For the multi-screen electronic device, fingerprint information needs to be obtained through all screens to extract and generate pre-stored fingerprint feature information corresponding to the screens.

In the embodiments of this application, in a case that an electronic device includes a first screen and a second screen, first fingerprint information of—a user is obtained through the first screen, then first fingerprint feature is extracted from the first fingerprint information based on a fingerprint recognition mode corresponding to the second screen and used as a first pre-stored fingerprint template corresponding to the second screen, and then second fingerprint information is obtained through the second screen, and finally, second fingerprint feature is extracted from the second fingerprint information, and it is determined whether the second fingerprint feature matches the first fingerprint template. Through the obtaining of the first fingerprint information and the extraction of the first pre-stored fingerprint template corresponding to the second screen, operations of the user during fingerprint recognition of the multi-screen electronic device are reduced, and user operation redundancy is reduced.

The technical solutions provided in the embodiments of this application are applied to an electronic device including a first screen and a second screen.

In the embodiments of this application, the electronic device includes N display screens. N is a positive integer greater than 2. The first screen is any screen in N display screens. The second screen is any screen in N display screens other than the first screen. It should be noted that, the display screen may include at least one of an OLED screen, an LCD screen, a UFB screen, a TFD screen, a TFT screen, an STN screen, and an AMOLED screen.

Figure 1:
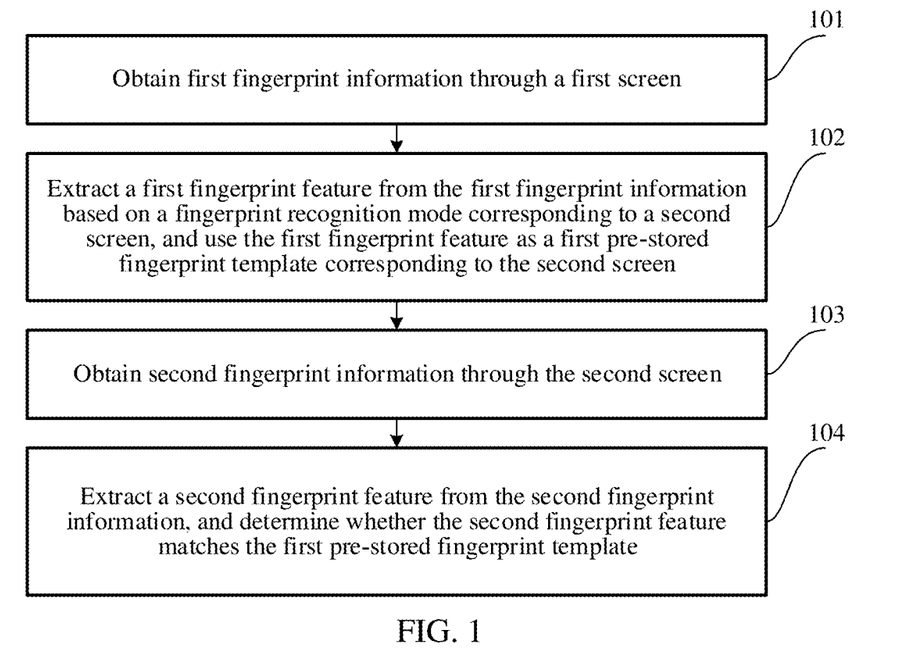
FIG. 1 is a schematic diagram I of a fingerprint recognition method according to an embodiment of this application.

As shown in FIG. 1, an embodiment of this application provides a fingerprint recognition method. The method may include the following step 101 to step 104.

Step 101: Obtain first fingerprint information through the first screen.

In this embodiment of this application, the first fingerprint information obtained from a user is obtained through the first screen in a fingerprint recognition mode corresponding to the first screen. The fingerprint recognition mode may be at least one of an under-screen optical fingerprint recognition mode, an under-screen ultrasonic fingerprint recognition mode, and a capacitive fingerprint recognition mode.

It may be understood that if the first fingerprint information includes valid fingerprint information of a plurality of fingers, before the obtaining of the first fingerprint information, a quantity of fingers corresponding to the first fingerprint information may be defined.

In an example, during the obtaining of the first fingerprint information, in case of a plurality of fingers, fingerprint information of one finger may be obtained each time. The first fingerprint information is obtained through a plurality of times of obtaining.

In another example, during the obtaining of the first fingerprint information, in case of a plurality of fingers, fingerprint information of the plurality of fingers may be obtained each time. The first fingerprint information is obtained through one time of obtaining.

Optionally, in this embodiment of this application, the first fingerprint information may alternatively be obtained through an independent fingerprint obtaining module corresponding to the first screen. A fingerprint recognition mode corresponding to the fingerprint obtaining module may be at least one of an optical fingerprint mode, a thermosensitive fingerprint mode, and a biological radio frequency fingerprint mode.

Step 102: Extract a first fingerprint feature from the first fingerprint information based on a fingerprint recognition mode corresponding to the second screen, and use the first fingerprint feature as a first pre-stored fingerprint template corresponding to the second screen.

In this embodiment of this application, the first fingerprint information is obtained through the first screen, and then the first fingerprint feature is extracted from the first fingerprint information based on the fingerprint recognition mode corresponding to the second screen, and the first fingerprint feature is used as the first pre-stored fingerprint template. The emphasis is that through the first fingerprint information obtained from the first screen, the first pre-stored fingerprint template corresponding to the second screen through can be determined.

It may be understood that, through the obtaining of the first fingerprint information through the first screen and the determination of the first pre-stored fingerprint template corresponding to the second screen that is different from the first screen, during recognition of the electronic device, obtaining of fingerprint information through each screen of the electronic device to determine a pre-stored fingerprint template corresponding to each screen is not required.

In this embodiment of this application, the first pre-stored fingerprint template is a basis for determining whether second fingerprint information obtained through the second screen succeeds in verification. In other words, matching is performed on the another piece of fingerprint information obtained through the second screen and the first pre-stored fingerprint template. If the another piece of fingerprint information matches the first pre-stored fingerprint template, the another piece of fingerprint information succeeds in fingerprint verification on the second screen. If the another piece of fingerprint information does not match the first pre-stored fingerprint template, the another piece of fingerprint information fails in fingerprint verification on the second screen, and therefore operations such as screen unlocking, payment, and application login cannot be performed.

Optionally, in this embodiment of this application, the first pre-stored fingerprint template may include fingerprint features of one or more fingers. If the first fingerprint information includes valid fingerprint information of a plurality of fingers, a pre-stored fingerprint template corresponding to the first fingerprint information includes a fingerprint feature extracted from the valid fingerprint information of each of the fingers.

Optionally, in this embodiment of this application, the first fingerprint information may be preprocessed before the extraction of the first fingerprint feature. A preprocessing manner adopted during the preprocessing includes at least one of background information removal, normalization, valid image extraction, Gabor filtering, direction enhancement, binarization, and dilation and corrosion.

In this embodiment of this application, it may be learned based on the fingerprint recognition mode corresponding to the second screen that the first fingerprint feature includes at least one of an outer profile, a ridge pattern, a core point, a delta point, a style line, a minutiae point type, a minutiae point direction, a minutiae point curvature, and a minutiae point position.

It may be understood that, accuracies of the fingerprint features recognized in the different fingerprint recognition modes and difficulties in recognizing the fingerprint features in the different fingerprint recognition modes are different. Therefore, the first fingerprint feature extracted based on the fingerprint recognition mode corresponding to the second screen is more prominent, so that an accuracy and a speed of subsequent fingerprint recognition can be increased.

For example, the fingerprint recognition mode corresponding to the second screen is the under-screen optical fingerprint recognition mode. Since the under-screen optical fingerprint recognition mode mainly relies on optical reflection to detect fingerprint patterns, the under-screen optical fingerprint recognition mode is sensitive to a luminance of a fingerprint obtaining area. Before the extraction of the first fingerprint feature, the first fingerprint information is segmented into fingerprint information images including fingerprint information, then fingerprint enhancement is performed on the fingerprint information images to reduce impact of a luminance on the first fingerprint feature, and then the fingerprint information images are binarized for data compression, and finally, the binary images are refined, and edge pixels are removed, so as to increase a fingerprint matching speed. The extraction of the first fingerprint feature means extracting the first fingerprint feature based on the refined images. The extraction of the first fingerprint feature may include: extracting at least one of a core point, a delta point, a minutiae point type, a minutiae point direction, a minutiae point curvature, and a minutiae point position based on a preset pixel block.

Step 103: Obtain second fingerprint information through the second screen.

In this embodiment of this application, the second fingerprint information is obtained through any screen (that is, the second screen) in the electronic device other than the first screen. The second fingerprint information may be used for unlocking the second screen.

Step 104: Extract a second fingerprint feature from the second fingerprint information, and determine whether the second fingerprint feature matches the first pre-stored fingerprint template.

In this embodiment of this application, the second fingerprint feature is extracted from the second fingerprint information based on the fingerprint recognition mode corresponding to the second screen.

In this embodiment of this application, the second fingerprint feature includes a core point, a delta point, a ridge count and corresponding directions, curvatures, and minutiae point positions of ridges.

In this embodiment of this application, based on the first pre-stored fingerprint template extracted from the first fingerprint information obtained through the first screen and the extracted, it is determined whether the second fingerprint information obtained through the second screen matches the first pre-stored fingerprint template. That is to say, a screen for obtaining the fingerprint information corresponding to the pre-stored fingerprint template is different from a screen for recognizing the fingerprint information corresponding to the pre-stored fingerprint template.

In the fingerprint recognition method provided in this embodiment of this application, in a case that the electronic device includes the first screen and the second screen, the first fingerprint information obtained from a user is obtained through the first screen, then the first fingerprint feature is extracted from the first fingerprint information based on the fingerprint recognition mode corresponding to the second screen and used as the first pre-stored fingerprint template corresponding to the second screen, and then the second fingerprint information is obtained through the second screen, and finally, the second fingerprint feature is extracted from the second fingerprint information, and it is determined whether the second fingerprint feature matches the first fingerprint template. Through the obtaining of the first fingerprint information and the extraction of the first pre-stored fingerprint template corresponding to the second screen, operations of the user during fingerprint recognition of the multi-screen electronic device are reduced, and user operation redundancy is reduced.

Optionally, in this embodiment of this application, after step 102, the method may further include step 102a and step 102b.

Step 102a: Determine the first pre-stored fingerprint template as a second pre-stored fingerprint template corresponding to the first screen in a case that a fingerprint recognition mode corresponding to the first screen is the same as the fingerprint recognition mode corresponding to the second screen.

Step 102b: Extract a third fingerprint feature from the first fingerprint information based on the fingerprint recognition mode corresponding to the first screen in a case that the fingerprint recognition mode corresponding to the first screen is different from the fingerprint recognition mode corresponding to the second screen, and use the third fingerprint feature as the second pre-stored fingerprint template corresponding to the first screen.

In this embodiment of this application, the first fingerprint information may be used as a basis for extracting the first pre-stored fingerprint template corresponding to the second screen. The first fingerprint information may be further used as a basis for extracting the second pre-stored fingerprint module corresponding to the first screen.

In this embodiment of this application, if the fingerprint recognition mode corresponding to the first screen is the same as the fingerprint recognition mode corresponding to the second screen, the first screen and the second screen may share the "the first pre-stored fingerprint template", and the first pre-stored fingerprint template is determined as the second pre-stored fingerprint template corresponding to the first screen.

In this embodiment of this application, if the fingerprint recognition modes corresponding to the first screen is different from the fingerprint recognition mode corresponding to the second screen, the third fingerprint feature is extracted from the first fingerprint information based on the fingerprint recognition mode corresponding to the first screen and is used as the second pre-stored fingerprint template corresponding to the first screen. It should be noted that, although the third fingerprint feature and the first fingerprint feature are both extracted based on the first fingerprint information, since the fingerprint recognition mode corresponding to the first screen is different from the fingerprint recognition mode corresponding to the second screen, the third fingerprint feature is different from the first fingerprint feature. That is to say, the third fingerprint feature is extracted based on the fingerprint recognition mode corresponding to the first screen.

In this embodiment of this application, after the extraction or determinnation of the second pre-stored fingerprint template corresponding to the first screen, the fingerprint information obtained through the first screen may be recognized based on the second pre-stored fingerprint template.

If the fingerprint recognition mode corresponding to the first screen is the same as the fingerprint recognition mode corresponding to the second screen, through the foregoing steps, a calculation time for extracting the first fingerprint feature for determining the second pre-stored fingerprint template and system resource consumption can be reduced, and calculation efficiency can be improved.

Figure 2:
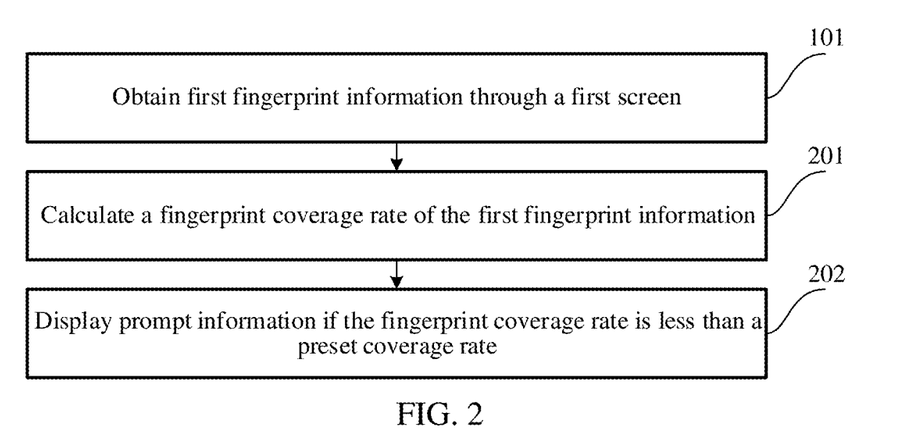
FIG. 2 is a schematic diagram II of a fingerprint recognition method according to an embodiment of this application.

Optionally, as shown in FIG. 2, in this embodiment of this application, after step 101 of obtaining the first fingerprint information, the fingerprint recognition method provided in this embodiment of this application may further include step 201 and step 202.

Step 201: Calculate a fingerprint coverage rate of the first fingerprint information.

Step 202: Display prompt information if the fingerprint coverage rate is less than a preset coverage rate.

In this embodiment of this application, the fingerprint coverage rate is a proportion of the first fingerprint information in an entire fingerprint of a single finger.

Further, optionally, in this embodiment of this application, the prompt information is used for prompting the user to re-input fingerprint information. It should be noted that, after the display of the prompt information, a current interface may be frozen, and a function key may be provided for the user to select a next operation. The function key may include at least one of: do not store the pre-stored fingerprint template, still obtain the first fingerprint information, and still store the first fingerprint information, so that the user independently determines whether to obtain the first fingerprint feature based on the current first fingerprint information.

For example, the function key may be triggered through at least one of a screen operation such as taping, double taping, touch and holding, or a specific gesture, a mechanical button operation, and a camera capturing a specific image.

Optionally, in this embodiment of this application, after step 202 of displaying the prompt information, in order to obtain complete fingerprint information, third fingerprint information may be obtained through the first screen to replace the original first fingerprint information.

Figure 3:
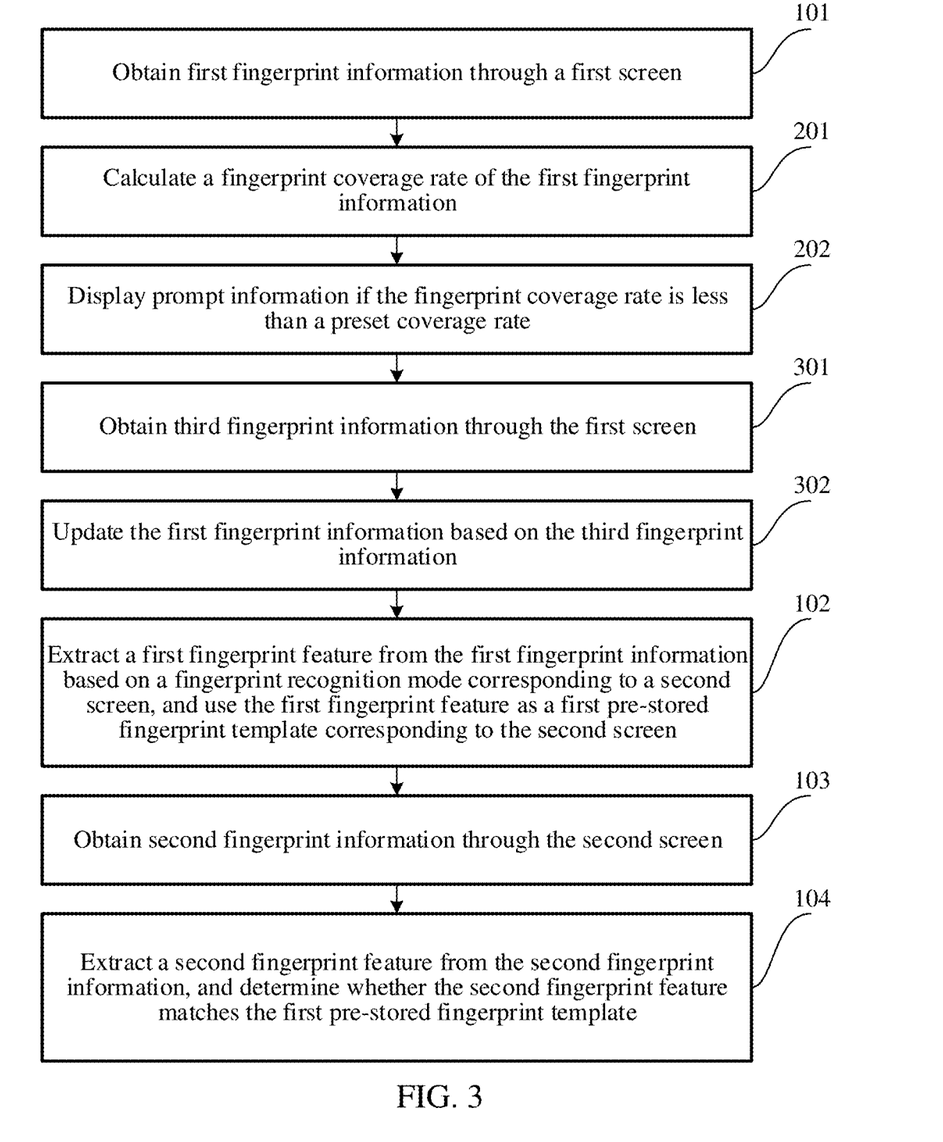
FIG. 3 is a schematic diagram III of a fingerprint recognition method according to an embodiment of this application.

Optionally, in this embodiment of this application, as shown in FIG. 3, after step 202 of displaying the prompt information, in order to obtain complete fingerprint information, the method may further include step 301 and step 302.

Step 301: Obtain third fingerprint information through the first screen.

Step 302: Update the first fingerprint information based on the third fingerprint information.

In this embodiment of this application, the third fingerprint information and the first fingerprint information are fingerprints of a same finger of the user.

In this embodiment of this application, the updating of the first fingerprint information based on the third fingerprint information may be replacing fingerprint data in the first fingerprint information with fingerprint data obtained through merging of the fingerprint data in the first fingerprint information and fingerprint data in the third fingerprint information. That is to say, the plurality of pieces of fingerprint information of the same finger obtained a plurality of times through the first screen are superposed.

In this embodiment of this application, after the updating of the first fingerprint information, it is determined whether to display the prompt information through step 201 and step 202.

Through the updating of the first fingerprint information, a case in which the user repeatedly obtains the fingerprint information when fingerprint information obtained a single time does not satisfy a coverage rate requirement and therefore the pre-stored fingerprint template includes increasing fingerprint features can be avoided, thereby improving a speed and efficiency of fingerprint recognition during subsequent fingerprint verification.

Figure 4:
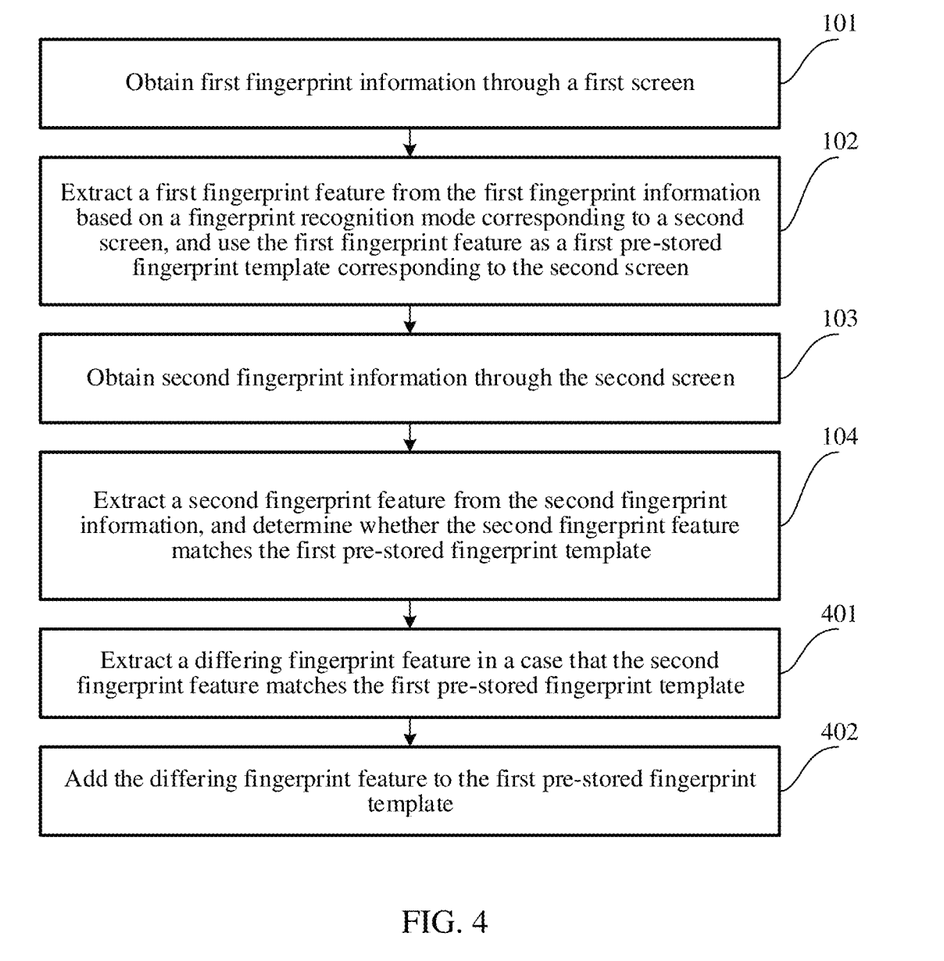
FIG. 4 is a schematic diagram IV of a fingerprint recognition method according to an embodiment of this application.

Optionally, as shown in FIG. 4, in this embodiment of this application, after step 104, the fingerprint recognition method provided in this embodiment of this application may further include step 401 and step 402.

Step 401: Extract a differing fingerprint feature in a case that the second fingerprint feature matches the first pre-stored fingerprint template.

Step 402: Add the differing fingerprint feature to the first pre-stored fingerprint template.

In this embodiment of this application, the differing fingerprint feature is a biological feature in which the second fingerprint feature differs from the first pre-stored fingerprint template.

In this embodiment of this application, since the first fingerprint information obtained through the first screen may not include all fingerprint features, the second fingerprint information and the first fingerprint information both may be used as a basis for extracting the first pre-stored fingerprint template. As second fingerprint information obtained through the second screen and successfully verified increases, the basis for extracting the first pre-stored fingerprint template is in a tendency of including all fingerprint features, so that accuracy of fingerprint recognition through the second screen increases.

In this embodiment of this application, since the extraction of the second fingerprint feature from the second fingerprint information (obtained through the second screen) and the extraction of the first fingerprint feature from the first fingerprint information are both performed based on the fingerprint recognition mode corresponding to the second screen, the second fingerprint feature and the first pre-stored fingerprint template may be directly used as a basis for updating the first pre-stored fingerprint template.

Based on the second fingerprint information obtained through the second screen and successfully recognized, an updating and learning mechanism is configured for the first pre-stored fingerprint template, to constantly improve the first pre-stored fingerprint template, thereby improving the accuracy of fingerprint recognition through the second screen.

Optionally, similar to the first pre-stored fingerprint template for which the updating and learning mechanism is used, an updating and learning mechanism may be used for the second pre-stored fingerprint template corresponding to the first screen. Based on fingerprint features corresponding to the fingerprint information obtained the first screen and successfully recognized and the second pre-stored fingerprint template, an updating and learning mechanism is configured for the second pre-stored fingerprint template, to improve the second pre-stored fingerprint template.

Figure 5:
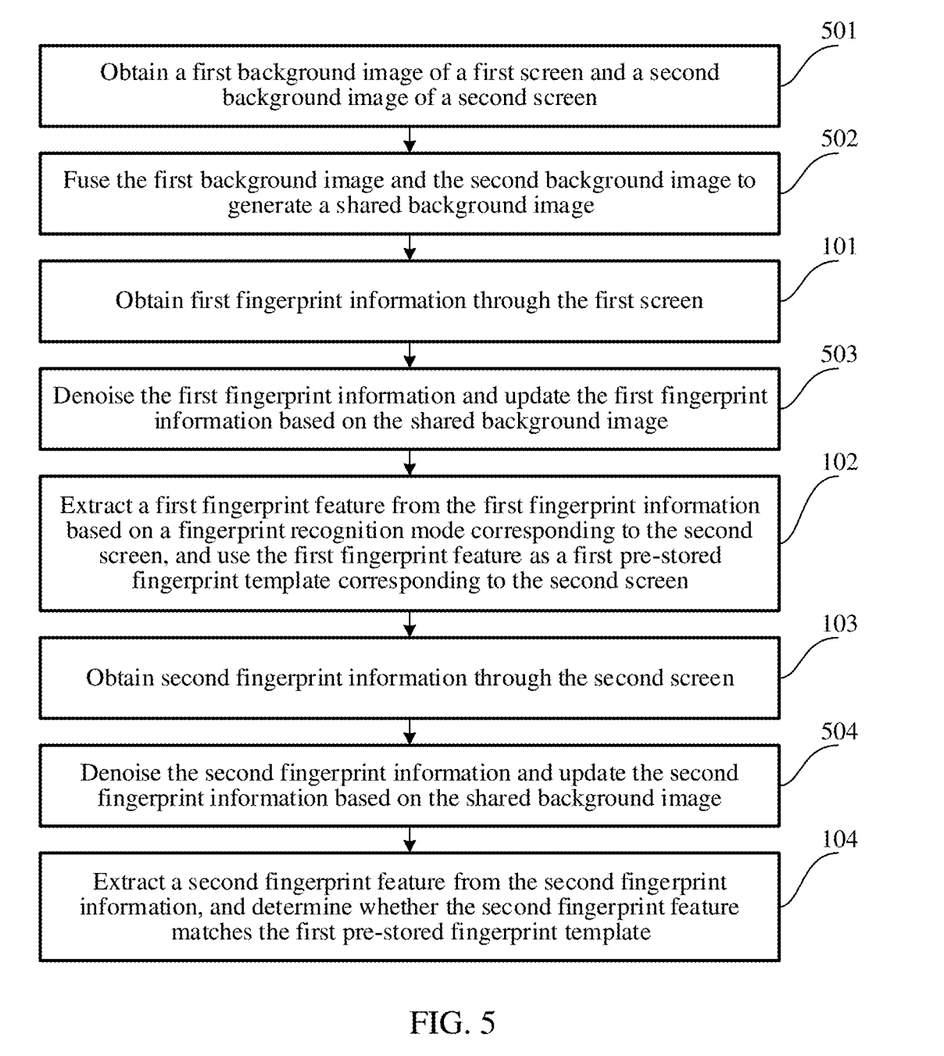
FIG. 5 is a schematic diagram V of a fingerprint recognition method according to an embodiment of this application.

Optionally, as shown in FIG. 5, in this embodiment of this application, before obtaining of the first fingerprint information, the fingerprint recognition method provided in this embodiment of this application may further include step 501 and step 502.

Step 501: Obtain a first background image of the first screen and a second background image of the second screen.

Step 502: Fuse the first background image and the second background image to generate a shared background image.

In this embodiment of this application, in addition to the captured fingerprint image, the fingerprint information obtained through the first screen or the second screen includes further includes the background information. The background information is an invalid signal resulted from impact of the screen or a fingerprint recognition sensor.

In this embodiment of this application, the shared background image may be obtained through averaging of pixel values of the first background image and the second background image.

Further, optionally, in this embodiment of this application, after step 101, the fingerprint recognition method provided in this embodiment of this application further includes step 503.

Step 503: Denoise the first fingerprint information and update the first fingerprint information based on the shared background image.

Further, optionally, in this embodiment of this application, after step 103, the fingerprint recognition method provided in this embodiment of this application further includes step 504.

Step 504: Denoise the second fingerprint information and update the second fingerprint information based on the shared background image.

It should be noted that, after the generation of the shared background image, the fingerprint information obtained through the first screen or second screen each time may be denoised and updated through the shared background image.

Through the denoising of the first fingerprint information or the second fingerprint information by using the shared background image, interference information during the fingerprint recognition can be reduced. In addition, through the replacement of the first background image and the second background image with the shared background image, a required data storage space can be reduced, thereby reducing wastes of system resources.

Figure 6:
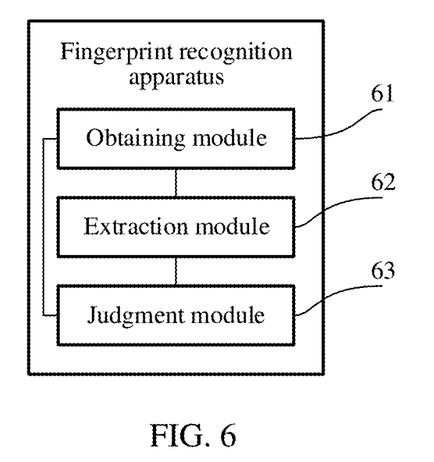
FIG. 6 is a schematic structural diagram I of a fingerprint recognition apparatus according to an embodiment of this application.

As shown in FIG. 6, an embodiment of this application provides a fingerprint recognition apparatus, which is applied to an electronic device including a first screen and a second screen. The apparatus includes an obtaining module 61, an extraction module 62, and a judgment module 63.

The obtaining module 61 is configured to obtain first fingerprint information through the first screen.

The extraction module 62 is configured to extract a first fingerprint feature from the first fingerprint information based on a fingerprint recognition mode corresponding to the second screen, and use the first fingerprint feature as a first pre-stored fingerprint template corresponding to the second screen.

The obtaining module 61 is further configured to obtain second fingerprint information through the second screen.

The judgment module 63 is configured to extract a second fingerprint feature from the second fingerprint information, and determine whether the second fingerprint feature matches the first pre-stored fingerprint template.

Optionally, the apparatus further includes a determination module.

The determination module is configured to determine the first pre-stored fingerprint template as a second pre-stored fingerprint template corresponding to the first screen in a case that a fingerprint recognition mode corresponding to the first screen is the same as the fingerprint recognition mode corresponding to the second screen.

The extraction module 62 is further configured to extract a third fingerprint feature from the first fingerprint information based on the fingerprint recognition mode corresponding to the first screen in a case that the fingerprint recognition mode corresponding to the first screen is different from the fingerprint recognition mode corresponding to the second screen, and use the third fingerprint feature as the second pre-stored fingerprint template corresponding to the first screen.

Optionally, the apparatus further includes a generation module and an updating module.

The obtaining module 61 is further configured to obtain a first background image of the first screen and a second background image of the second screen.

The generation module is configured to fuse the first background image and the second background image to generate a shared background image.

The updating module is configured to denoise the first fingerprint information and update the first fingerprint information based on the shared background image.

Optionally, the apparatus further includes an adding module.

The extraction module 62 is further configured to extract a differing fingerprint feature in a case that the second fingerprint feature matches the first pre-stored fingerprint template, where the differing fingerprint feature is a biological feature in which the second fingerprint feature differs from the first pre-stored fingerprint template.

The adding module is configured to add the differing fingerprint feature to the first pre-stored fingerprint template.

Optionally, the fingerprint recognition mode includes at least one of an under-screen optical fingerprint recognition mode, an under-screen ultrasonic fingerprint recognition mode, and a capacitive fingerprint recognition mode.

In the fingerprint recognition apparatus provided in this embodiment of this application, in a case that the electronic device includes the first screen and the second screen, the first fingerprint information obtained from a user is obtained through the first screen, then the first fingerprint feature is extracted from the first fingerprint information based on the fingerprint recognition mode corresponding to the second screen and used as the first pre-stored fingerprint template corresponding to the second screen, and then the second fingerprint information is obtained through the second screen, and finally, the second fingerprint feature is extracted from the second fingerprint information, and it is determined whether the second fingerprint feature matches the first fingerprint template. Through the obtaining of the first fingerprint information and the extraction of the first pre-stored fingerprint template corresponding to the second screen, operations of the user during fingerprint recognition of the multi-screen electronic device are reduced, and user operation redundancy is reduced.

The fingerprint recognition apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palm computer, an on-board electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or a self-service machine. This is not specifically limited in this embodiment of this application.

The fingerprint recognition apparatus in this embodiment of this application may be an apparatus having an operating system. The operating system may be Android, IOS, or another possible operating system, which is not specifically limited in this embodiment of this application.

The fingerprint recognition apparatus provided in this embodiment of this application can implement all processes implemented in the method embodiments of FIG. 1 to FIG. 5. In order to avoid repetition, details are not described herein.

For beneficial effects of various implementations in this embodiment, refer to the beneficial effects of the corresponding implementations in the foregoing method embodiments. In order to avoid repetition, details are not described herein.

Figure 7:
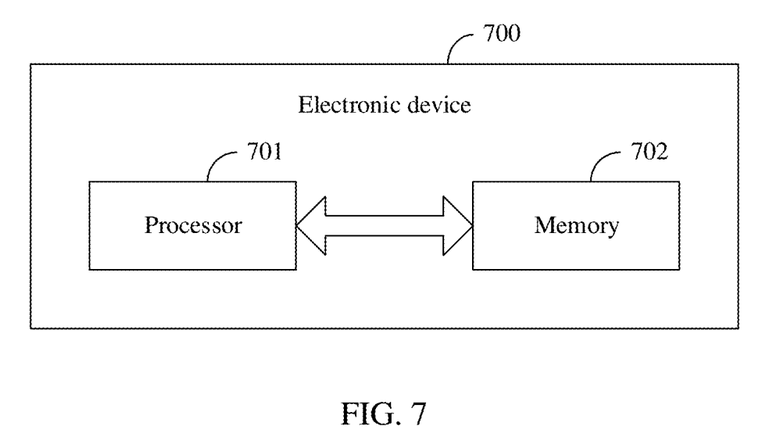
FIG. 7 is a schematic hardware diagram I of an electronic device according to an embodiment of this application.

Optionally, as shown in FIG. 7, an embodiment of this application further provides an electronic device 700, including a processor 701, a memory 702, a program or an instruction stored in the memory 702 and executable in the processor 701. The program or the instruction, when executed by the processor 701, implements the processes of the embodiment of the foregoing fingerprint recognition method, and can achieve the same technical effects. In order to avoid repetition, details are not described herein.

It should be noted that, the electronic device in this embodiment of this application includes both the above mobile electronic device and the above non-mobile electronic device.

Figure 8:
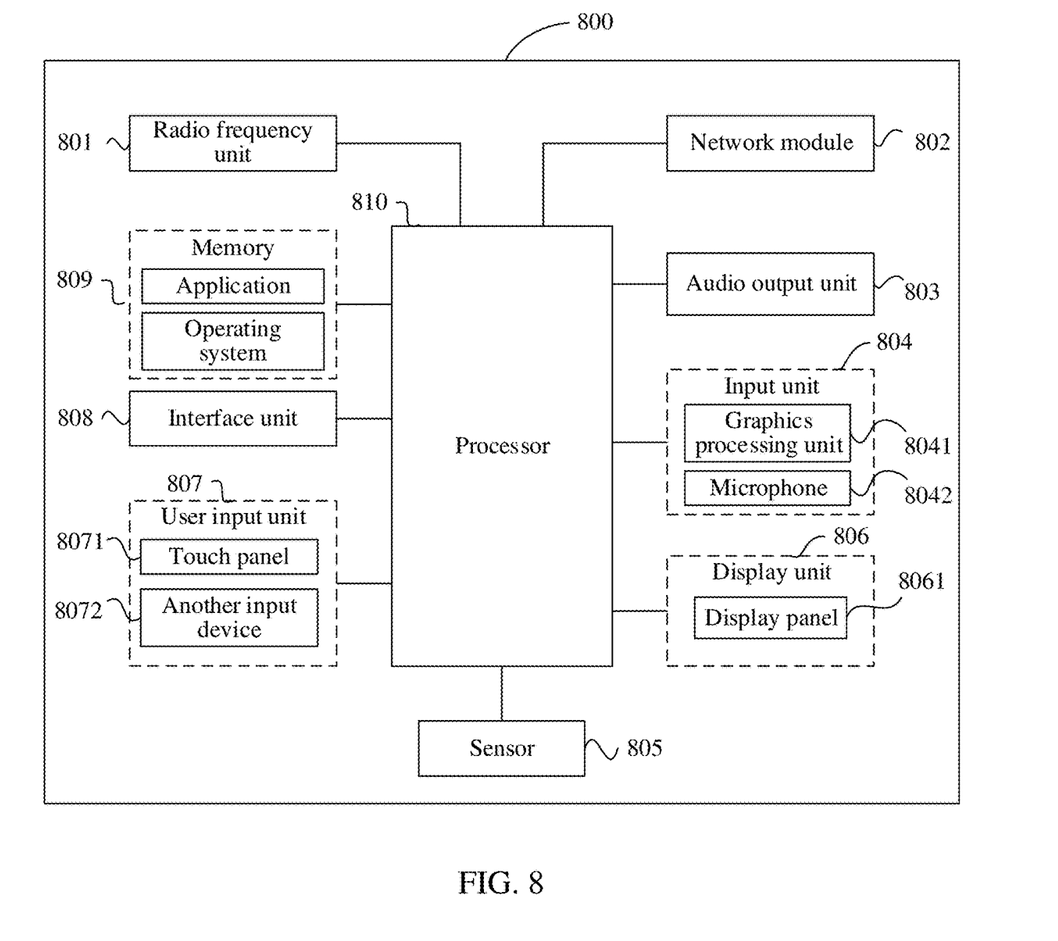
FIG. 8 is a schematic hardware diagram II of hardware of an electronic device according to an embodiment of this application.

FIG. 8 is a schematic diagram of a hardware structure of an electronic device for implementing an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that the electronic device 800 may further include a power supply (such as a battery) that supplies power to the components. The power supply may be logically connected to the processor 810 through a power management system, thereby implementing functions such as management of charging, discharging, and power consumption through the power management system. The electronic device structure shown in FIG. 8 constitutes no limitation on the electronic device, and the electronic device may include more or fewer components than those shown in the figure, or a combination of some components, or different component arrangements. Details are not described herein.

The processor 810 is configured to: obtain first fingerprint information through a first screen; extract a first fingerprint feature from the first fingerprint information based on a fingerprint recognition mode corresponding to a second screen, and use the first fingerprint feature as a first pre-stored fingerprint template corresponding to the second screen; obtain second fingerprint information through the second screen; and extract a second fingerprint feature from the second fingerprint information, and determine whether the second fingerprint feature matches the first pre-stored fingerprint template.

Optionally, the processor 810 is further configured to: after the extraction of the first fingerprint feature from the first fingerprint information based on the fingerprint recognition mode corresponding to the second screen and the use of the first fingerprint feature as the first pre-stored fingerprint template corresponding to the second screen, determine the first pre-stored fingerprint template as a second pre-stored fingerprint template corresponding to the first screen in a case that a fingerprint recognition mode corresponding to the first screen is the same as the fingerprint recognition mode corresponding to the second screen; extract a third fingerprint feature from the first fingerprint information based on the fingerprint recognition mode corresponding to the first screen in a case that the fingerprint recognition mode corresponding to the first screen is different from the fingerprint recognition mode corresponding to the second screen, and use the third fingerprint feature as the second pre-stored fingerprint template corresponding to the first screen.

Optionally, the processor 810 is further configured to: before the obtaining of the first fingerprint information through the first screen, obtain a first background image of the first screen and a second background image of the second screen; and fuse the first background image and the second background image to generate a shared background image.

The processor 810 is further configured to: after the obtaining of the first fingerprint information through the first screen, denoise the first fingerprint information and update the first fingerprint information based on the shared background image.

Optionally, the processor 810 is further configured to: after the extraction of the second fingerprint feature from the second fingerprint information and the determination whether the second fingerprint feature matches the first pre-stored fingerprint template, extract a differing fingerprint feature in a case that the second fingerprint feature matches the first pre-stored fingerprint template, where the differing fingerprint feature is a biological feature in which the second fingerprint feature differs from the first pre-stored fingerprint template; and add the differing fingerprint feature to the first pre-stored fingerprint template.

Optionally, the fingerprint recognition mode includes at least one of an under-screen optical fingerprint recognition mode, an under-screen ultrasonic fingerprint recognition mode, and a capacitive fingerprint recognition mode.

In the electronic device provided in this embodiment of this application, in a case that the electronic device includes the first screen and the second screen, the first fingerprint information obtained from a user is obtained through the first screen, then the first fingerprint feature is extracted from the first fingerprint information based on the fingerprint recognition mode corresponding to the second screen and used as the first pre-stored fingerprint template corresponding to the second screen, and then the second fingerprint information is obtained through the second screen, and finally, the second fingerprint feature is extracted from the second fingerprint information, and it is determined whether the second fingerprint feature matches the first fingerprint template. Through the obtaining of the first fingerprint information and the extraction of the first pre-stored fingerprint template corresponding to the second screen, operations of the user during fingerprint recognition of the multi-screen electronic device are reduced, and user operation redundancy is reduced.

For beneficial effects of various implementations in this embodiment, refer to the beneficial effects of the corresponding implementations in the foregoing method embodiments. In order to avoid repetition, details are not described herein.

It should be noted that in this embodiment of this application, the input unit 804 may include a graphics processing unit (GPU) 8041 and a microphone 8042. The graphics processing unit 8041 processes image data of a static picture or a video obtained by an image capture apparatus (for example, a camera) in a video capture mode or an image capture mode. The display unit 806 may include a display panel 8061. The display panel 8061 may be configured in a form such as a liquid crystal display or an organic light-emitting diode. The user input unit 807 includes a touch panel 8071 and another input device 8072. The touch panel 8071 is also referred to as a touch screen. The touch panel 8071 may include two parts: a touch detection apparatus and a touch controller. The another input device 8072 may include but is not limited to a physical keyboard, a function button (such as a volume control button or a power button), a trackball, a mouse, and a joystick. Details are not described herein. The memory 809 may be configured to store software programs and various data, including but not limited to applications and operating systems. An application processor and a modem processor may be integrated into the processor 810. The application processor mainly processes an operating system, a user interface, an application, and the like. The modem processor mainly processes wireless communication. It may be understood that the modem processor may alternatively not be integrated in the processor 810.

An embodiment of this application further provides a non-transitory readable storage medium. The readable storage medium stores a program or an instruction. When the program or an instruction is executed by a processor, the processes of the embodiment of the foregoing fingerprint recognition method are implemented, and the same technical effects can be achieved. In order to avoid repetition, details are not described herein.

The processor is a processor in the electronic device described in the foregoing embodiment. The non-transitory readable storage medium includes a non-transitory computer-readable storage medium, such as a computer read-only memory (ROM), a random access memory (RAM), a magnetic disk, or an optical disk.

An embodiment of this application further provides a chip. The chip includes a processor and a communication interface. The communication interface is coupled to the processor. The processor is configured to execute a program or an instruction to implement the processes of the embodiment of the foregoing fingerprint recognition method, and can achieve the same technical effects. In order to avoid repetition, details are not described herein.

It should be understood that the chip in this embodiment of this application may also be referred to as a system level chip, a system chip, a chip system, a system on chip, or the like.

It should be noted that, a term "comprise", "include", or any other variant herein is intended to encompass non-exclusive inclusion, so that a process, a method, an article or an apparatus including a series of elements not only includes those elements, but also includes another element not listed explicitly or includes intrinsic elements for the process, the method, the article, or the apparatus. Without any further limitation, an element defined by the phrase "include one . . . " does not exclude existence of another same element in the process, the method, the article, or the apparatus that includes the elements. In addition, it should be noted that the scope of the method and the apparatus in the embodiments of this application is not limited to function execution in the order shown or discussed, and may further include function execution in a substantially simultaneous manner or in the opposite order based on the functions. For example, the described method may be performed in different order from the described order, and various steps may also be added, omitted, or combined. In addition, the features described with reference to some examples may be combined in another example.

According to the descriptions of the foregoing implementations, a person skilled in the art may clearly learn that the method in the foregoing embodiments may be implemented by software using a necessary universal hardware platform, or may be implemented by hardware. However, in most cases, software using a general hardware platform is an example implementation. Based on such an understanding, the technical solution of this application, in essence, or a part contributing to the related art may be embodied in a form of a computer software product. The software product is stored in a storage medium (such as a ROM/RAM, a disk, or a compact disc), including an instruction for causing a terminal (such as a mobile phone, a computer, a server, or a network device) to perform the method in the embodiments of this application.

Although the embodiments of this application are described above with reference to the drawings, this application is not limited to the specific embodiments described above. The foregoing specific embodiments are illustrative but not restrictive. With the enlightenment of this application, a person of ordinary skill in the art may make many forms without departing from the concept of this application and the protection scope of the claims. These forms fall within the protection of this application.

What is claimed is:

1. A fingerprint recognition method, performed by an electronic device comprising a first screen and a second screen, the method comprising:
    obtaining first fingerprint information through the first screen;
    extracting a first fingerprint feature from the first fingerprint information based on a fingerprint recognition mode corresponding to the second screen, and using the first fingerprint feature as a first pre-stored fingerprint template corresponding to the second screen;
    obtaining second fingerprint information through the second screen; and
    extracting a second fingerprint feature from the second fingerprint information, and determining whether the second fingerprint feature matches the first pre-stored fingerprint template; wherein
    after the extracting the first fingerprint feature from the first fingerprint information based on the fingerprint recognition mode corresponding to the second screen, and using the first fingerprint feature as the first pre-stored fingerprint template corresponding to the second screen, the method further comprises:

determining the first pre-stored fingerprint template as a second pre-stored fingerprint template corresponding to the first screen in a case that a fingerprint recognition mode corresponding to the first screen is the same as the fingerprint recognition mode corresponding to the second screen; and extracting a third fingerprint feature from the first fingerprint information based on the fingerprint recognition mode corresponding to the first screen in a case that the fingerprint recognition mode corresponding to the first screen is different from the fingerprint recognition mode corresponding to the second screen, and using the third fingerprint feature as the second pre-stored fingerprint template corresponding to the first screen.

2. The method according to claim 1, wherein before the obtaining first fingerprint information through the first screen, the method further comprises:

obtaining a first background image of the first screen and a second background image of the second screen; and fusing the first background image and the second background image to generate a shared background image; and after the obtaining first fingerprint information through the first screen, the method further comprises:

denoising the first fingerprint information and updating the first fingerprint information based on the shared background image.

3. The method according to claim 1, wherein after the extracting a second fingerprint feature from the second fingerprint information, and determining whether the second fingerprint feature matches the first pre-stored fingerprint template, the method further comprises:

extracting a differing fingerprint feature in a case that the second fingerprint feature matches the first pre-stored fingerprint template, wherein the differing fingerprint feature is a biological feature in which the second fingerprint feature differs from the first pre-stored fingerprint template; and adding the differing fingerprint feature to the first pre-stored fingerprint template.

4. The method according to claim 1, wherein the fingerprint recognition mode comprises at least one of an under-screen optical fingerprint recognition mode, an under-screen ultrasonic fingerprint recognition mode, and a capacitive fingerprint recognition mode.

5. An electronic device, comprising a first screen, a second screen, a processor, a memory, and a program or an instruction stored in the memory and executable in the processor, wherein the program or the instruction, when executed by the processor, causes the electronic device to perform:

obtaining first fingerprint information through the first screen;

extracting a first fingerprint feature from the first fingerprint information based on a fingerprint recognition mode corresponding to the second screen, and using the first fingerprint feature as a first pre-stored fingerprint template corresponding to the second screen;

obtaining second fingerprint information through the second screen; and extracting a second fingerprint feature from the second fingerprint information, and determining whether the second fingerprint feature matches the first pre-stored fingerprint template; wherein the program or the instruction, when executed by the processor, causes the electronic device to further perform:

determining the first pre-stored fingerprint template as a second pre-stored fingerprint template corresponding to the first screen in a case that a fingerprint recognition mode corresponding to the first screen is the same as the fingerprint recognition mode corresponding to the second screen; and extracting a third fingerprint feature from the first fingerprint information based on the fingerprint recognition mode corresponding to the first screen in a case that the fingerprint recognition mode corresponding to the first screen is different from the fingerprint recognition mode corresponding to the second screen, and using the third fingerprint feature as the second pre-stored fingerprint template corresponding to the first screen.

6. The electronic device according to claim 5, wherein the program or the instruction, when executed by the processor, causes the electronic device to further perform:

obtaining a first background image of the first screen and a second background image of the second screen; and fusing the first background image and the second background image to generate a shared background image; and after the obtaining first fingerprint information through the first screen, the method further comprises:

denoising the first fingerprint information and updating the first fingerprint information based on the shared background image.

7. The electronic device according to claim 5, wherein the program or the instruction, when executed by the processor, causes the electronic device to further perform:

extracting a differing fingerprint feature in a case that the second fingerprint feature matches the first pre-stored fingerprint template, wherein the differing fingerprint feature is a biological feature in which the second fingerprint feature differs from the first pre-stored fingerprint template; and adding the differing fingerprint feature to the first pre-stored fingerprint template.

8. The electronic device according to claim 5, wherein the fingerprint recognition mode comprises at least one of an under-screen optical fingerprint recognition mode, an under-screen ultrasonic fingerprint recognition mode, and a capacitive fingerprint recognition mode.

9. A non-transitory readable storage medium, storing a program or an instruction, wherein the program or the instruction, when executed by a processor of an electronic device including a first screen and a second screen, causes the electronic device to perform:

obtaining first fingerprint information through the first screen;

extracting a first fingerprint feature from the first fingerprint information based on a fingerprint recognition mode corresponding to the second screen, and using the first fingerprint feature as a first pre-stored fingerprint template corresponding to the second screen;

obtaining second fingerprint information through the second screen; and extracting a second fingerprint feature from the second fingerprint information, and determining whether the second fingerprint feature matches the first pre-stored fingerprint template; wherein the program or the instruction, when executed by the processor, causes the electronic device to further perform:

determining the first pre-stored fingerprint template as a second pre-stored fingerprint template corresponding to the first screen in a case that a fingerprint recognition mode corresponding to the first screen is the same as the fingerprint recognition mode corresponding to the second screen; and extracting a third fingerprint feature from the first fingerprint information based on the fingerprint recognition mode corresponding to the first screen in a case that the fingerprint recognition mode corresponding to the first screen is different from the fingerprint recognition mode corresponding to the second screen, and using the third fingerprint feature as the second pre-stored fingerprint template corresponding to the first screen.

10. The non-transitory readable storage medium according to claim 9, wherein the program or the instruction, when executed by the processor, causes the electronic device to further perform:

obtaining a first background image of the first screen and a second background image of the second screen; and fusing the first background image and the second background image to generate a shared background image; and after the obtaining first fingerprint information through the first screen, the method further comprises:

denoising the first fingerprint information and updating the first fingerprint information based on the shared background image.

11. The non-transitory readable storage medium according to claim 9, wherein the program or the instruction, when executed by the processor, causes the electronic device to further perform:

extracting a differing fingerprint feature in a case that the second fingerprint feature matches the first pre-stored fingerprint template, wherein the differing fingerprint feature is a biological feature in which the second fingerprint feature differs from the first pre-stored fingerprint template; and adding the differing fingerprint feature to the first pre-stored fingerprint template.

12. The non-transitory readable storage medium according to claim 9, wherein the fingerprint recognition mode comprises at least one of an under-screen optical fingerprint recognition mode, an under-screen ultrasonic fingerprint recognition mode, and a capacitive fingerprint recognition mode.

* * * * *